United States Patent [19]

Grunert et al.

[11] Patent Number: 4,500,320
[45] Date of Patent: Feb. 19, 1985

[54] USE OF FINE-PARTICULATE ALKALI METAL ALUMINO-SILICATES IN THE PROCESS OF DYE SOAPING

[75] Inventors: Heinz Grunert, Dusseldorf; Fritz Hahn, Leichlingen; Ulrich Rall, Langenfeld; Klaus Schumann, Erkrath; Milan J. Schwuger, Haan; Heinz G. Smolka, Langenfeld, all of Fed. Rep. of Germany

[73] Assignee: Henkel Kommanditgesellschaft auf Aktien, Düsseldorf-Holthausen, Fed. Rep. of Germany

[21] Appl. No.: 469,420

[22] Filed: Feb. 24, 1983

Related U.S. Application Data

[63] Continuation of Ser. No. 102,787, Dec. 12, 1979, abandoned, which is a continuation of Ser. No. 903,598, May 8, 1978, abandoned.

[30] Foreign Application Priority Data

May 13, 1977 [AT] Austria ................... 3444/77

[51] Int. Cl.³ ............................. B08B 3/00; D06P 5/02
[52] U.S. Cl. ............................. 8/442; 8/532; 8/137
[58] Field of Search ............................. 8/442, 137, 532

[56] References Cited

U.S. PATENT DOCUMENTS

| | | | |
|---|---|---|---|
| 3,576,589 | 4/1971 | Coon | 8/137 |
| 3,684,431 | 8/1972 | Bischof et al. | 8/137 |
| 4,083,793 | 4/1978 | Jakobi et al. | 252/99 |
| 4,121,903 | 10/1975 | Smolka | 8/137 |
| 4,148,603 | 4/1979 | Schwager et al. | 8/137 |

FOREIGN PATENT DOCUMENTS

| | | | |
|---|---|---|---|
| 765013 | 8/1971 | Belgium | 8/137 |
| 2543946 | 4/1976 | Fed. Rep. of Germany | 8/137 |

OTHER PUBLICATIONS

Leffingwell, G., Textile Colorist, vol. 6, No. 781, 1/44.
Beech, F., *The Dyeing of Cotton Fabrics*, Von Nostrand Co., N.Y., 1917.

*Primary Examiner*—Maria Parrish Tungol
*Attorney, Agent, or Firm*—Hammond & Littell, Weissenberger & Dippert

[57] ABSTRACT

In the process of dyeing or printing textile materials comprising subjecting textile material to the action of aqueous dye solutions or suspensions at elevated temperatures, followed by soaping with soaping agents and recovery of the dyed or printed textile materials, the improvement consisting essentially of employing a fine-particulate, water-insoluble alkali metal aluminosilicate, containing bound water, of the formula $$(M_2O)_x \cdot Al_2O_3 \cdot (SiO_2)_y$$

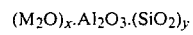

wherein M represents an alkali metal, x is an integer from 0.7 to 1.5 and y is an integer from 0.8 to 6, said aluminosilicates having an average particle size in the range of from 0.1 to 25μ and a calcium binding power of from 20 to 200 mg CaO/gm of anhydrous active substance measured at 22° C. according to the Calcium Binding Power Test Method set out in the specification, as an auxiliary soaping agent.

14 Claims, No Drawings

USE OF FINE-PARTICULATE ALKALI METAL ALUMINO-SILICATES IN THE PROCESS OF DYE SOAPING

This application is a continuation of U.S. patent application Ser. No. 102,787, filed Dec. 12, 1979 now abandoned, which in turn is a continuation of U.S. patent application Ser. No. 903,598, filed May 8, 1978 now abandoned.

BACKGROUND OF THE INVENTION

For the purpose of improving the fastness of dyes or prints on textile material, it is customary to effect an after-treatment, usually designated "soaping", following the dyeing or printing process. Alkaline salts, such as sodium carbonate, are frequently used for this soaping process in addition to anionic and/or nonionic surface-active compounds or tensides. Loosely adhering dye is thereby either washed out by the soap from the fiber or it is more strongly fixed, thus leading to an increase in the washing fastness and rubbing fastness of the dyed textile material. This increased fixing of the dye arises from the agglomeration of individual molecules of dye to form molecular associations. Substances such as carboxymethyl cellulose or builders, such as are used in washing agents, do not improve the fastness of the dyes, or do not improve it to an adequate extent. In contrast to conventional domestic washing methods, the processing waters used in the textile industry, that is in the dyeing baths, rinsing and soaping liquors, are usually pre-softened.

OBJECTS OF THE INVENTION

An object of the present invention is the development of an improvement in the process of dyeing or printing textile materials comprising subjecting textile material to the action of aqueous dye solutions or suspensions at elevated temperatures, followed by soaping with soaping agents and recovery of the dyed or printed textile materials, the improvement consisting essentially of employing a fine-particulate, water-insoluble alkali metal aluminosilicate, containing bound water, of the formula

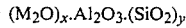

wherein M represents an alkali metal, x is an integer from 0.7 to 1.5 and y is an integer from 0.8 to 6, said aluminosilicates having an average particle size in the range of from 0.1 to 25μ and a calcium binding power of from 20 to 200 mg CaO/gm of anhydrous active substance measured at 22° C. according to the Calcium Binding Power Test Method set out in the specification, as an auxiliary soaping agent.

This and other objects of the invention will become more apparent as the description thereof proceeds.

DESCRIPTION OF THE INVENTION

It has now been found that the conventional soaping process employed in dyeing or printing textiles can be considerably improved by using fine-particulate, water-insoluble alkali metal aluminosilicates, preferably combined with anionic and/or nonionic surface-active compounds. The following advantages are then obtained:

1. The fastness of the dyes and prints, particularly the washing and rubbing fastness, is distinctly improved particularly in the case of dyes which are known to be critical.

2. The frequently practised addition of highly alkaline compounds, such as sodium carbonate, can be dispensed with.

3. The quantity of surface-active compound conventionally used for soaping can be considerably reduced when using the substances in accordance with the invention.

4. Compared with the standard method, particularly when using sodium carbonate, the liquors and waste waters of the soaping process are less highly alkaline and contain only small quantities of electrolytes. This has a favorable effect on the quality of the waste water.

5. Owing to the calcium binding capacity of the alkali metal aluminosilicates, trouble caused by variations in the hardness of the processing waters can be eliminated.

6. The soaping process can be shortened and water for rinsing can be saved.

7. The bleeding or running of the background shade of the print is at the same time reduced or avoided when using the substances in accordance with the invention.

The subject of the invention is the use, as auxiliary soaping agents for dyes and prints on textile material, of fine-particulate, water-insoluble alkali metal aluminosilicates of the general formula

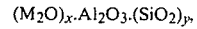

in which M represents an alkali metal ion, preferably a sodium ion, x represents a number of from 0.7 to 1.5, y represents a number of from 0.8 to 6, preferably 1.3 to 4, which aluminosilicates have a particle size of from 0.1 to 25μ, preferably 1 to 12μ, and a calcium binding capacity of 20 to 200 mg CaO/gm of anhydrous active substance at 22° C. The determination of the calcium binding power is described before the examples.

More particularly, the present invention relates to the improvement in the process of dyeing or printing textile materials comprising subjecting textile material to the action of aqueous dye solutions or suspensions at elevated temperatures, followed by soaping with soaping agents and recovery of the dyed or printed textile materials, the improvement consisting essentially of employing a fine-particulate, water-insoluble alkali metal aluminosilicate, containing bound water, of the formula

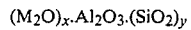

wherein M represents an alkali metal, x is an integer from 0.7 to 1.5 and y is an integer from 0.8 to 6, said aluminosilicates having an average particle size in the range of from 0.1 to 25μ and a calcium binding power of from 20 to 200 mg CaO/gm of anhydrous active substance measured at 22° C. according to the Calcium Binding Power Test Method set out in the specification, as an auxiliary soaping agent.

The alkali metal aluminosilicates, to be used according to the present invention, can be produced synthetically in a simple manner, for example, by reaction of water-soluble silicates with water-soluble aluminates in the presence of water. For this purpose, aqueous solutions of the starting materials can be mixed with one another, or a component present in a solid state may be reacted with the other component present in the form of an aqueous solution. The desired aluminosilicates are also obtained by mixing the two components, present in a solid state, in the presence of water. Alkali metal aluminosilicates can also be produced from Al(OH)$_3$, Al$_2$O$_3$ or SiO$_2$ by reaction with alkali metal silicate solutions or aluminate solutions respectively. Finally, substances of this type are also formed from the melt, although, owing to the high melting temperatures required and the necessity of converting the melt into finely distributed products, this method appears to be less interesting from an economic viewpoint.

The alkali metal aluminosilicates and their preparation are described in U.S. Pat. No. 4,071,377, as well as in U.S. patent application Ser. No. 458,306, filed Apr. 5, 1974, now abandoned in favor of its continuation Ser. No. 800,308, filed May 25, 1977, now abandoned. These alkali metal aluminosilicates as produced by precipitation, or converted to an aqueous suspension in a finely distributed state by other methods, may be converted from the amorphous state into the aged or crystalline state by heating to temperatures of from 50° to 200° C. The amorphous or crystalline alkali metal aluminosilicate, present in an aqueous suspension, can be separated from the remaining aqueous solution by filtration and can be dried at temperatures of, for example, 50° to 800° C. The product contains a greater or smaller quantity of bound water according to the drying conditions. Anhydrous products are obtained by drying for 1 hour at 800° C. However, the hydrous products are preferred, particularly those obtained when drying at 50° to 400° C., particularly 50° to 200° C. Suitable products can have, for example, water contents of approximately 2% to 30%, usually approximately 8% to 27%, relative to their total weight.

The precipitation conditions can contribute to the formation of the desired small particle sizes of from 1 to 12μ, the intermixed aluminate and silicate solutions, which may also be introduced simultaneously into the reaction vessel, are subjected to high shearing forces by, for example, intensively agitating the suspension. When crystallized alkali metal aluminosilicates are produced (these are preferably used in accordance with the invention), the formation of large, possibly interpenetrating crystals, is thus prevented by slow agitation of the crystallizing compound.

Nevertheless, undesired agglomeration of crystal particles can occur during drying, so that it may be advisable to remove these secondary particles in a suitable manner by, for example, air separators. Alkali metal aluminosilicates obtained in a coarser state, and which have been ground to the desired grain size, can also be used. By way of example, mills and/or air separators, or combinations thereof, are suitable for this purpose.

Preferred products are, for example, synthetically produced crystalline alkali metal aluminosilicates of the composition

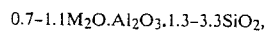
0.7–1.1M$_2$O.Al$_2$O$_3$.1.3–3.3SiO$_2$, in which M represents an alkali metal cation, preferably a sodium cation. It is advantageous if the alkali metal aluminosilicate crystallites have rounded corners and edges.

If it is desired to produce the alkali metal aluminosilicates with rounded corners and edges, it is advantageous to start with a preparation whose molar composition lies preferably in the range

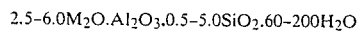
2.5–6.0M$_2$O.Al$_2$O$_3$.0.5–5.0SiO$_2$.60–200H$_2$O wherein M has the meaning given above and, in particular, signifies the sodium ion. This preparation is crystallized in a conventional manner. Advantageously, this is effected by heating the preparation for at least ½ hour to 70° to 120° C., preferably to 80° to 95° C., under agitation. The crystalline product is isolated in a simple manner by separating the liquid phase. If required, it is advisable to re-wash the products with water, and to dry them, before further processing. Even when working with a preparation whose composition differs only slightly from that stated above, one still obtains products having rounded corners and edges, particularly when the difference only relates to one of the four concentration parameters given above.

Furthermore, fine-particulate water-insoluble alkali metal aluminosilicates may also be used in the method of the invention which have been precipitated and aged or crystallized in the presence of water-soluble inorganic or organic dispersing agents. Products of this type are described in U.S. patent applications Ser. No. 503,467, filed Sept. 5, 1974, now abandoned; Ser. No. 763,667, filed Jan. 28, 1977, now abandoned; and Ser. No. 811,964, filed June 30, 1977, now U.S. Pat. No. 4,126,574. They are obtainable in a technically simple manner. Suitable water-soluble organic dispersing agents are surface-active compounds, non-surface-active-like aromatic sulfonic acids and compounds having a complex-forming capacity for calcium. The said dispersing agents may be introduced into the reaction mixture in an optional manner before or during precipitation, and, for example, they may be introduced in the form of a solution or they may be dissolved in the aluminate solution and/or silicate solution. Particularly satisfactory effects are obtained when the dispersing agent is dissolved in the silicate solution. The quantity of dispersing agent should be at least 0.05 percent by weight, preferably 0.1 to 5 percent by weight, based on the total amount of precipitate obtained. The product of precipitation is heated to temperatures of from 50° to 200° C. for ½ to 24 hours for the purpose of ageing or crystallization. By way of example, sodium lauryl ether sulfate, sodium polyacrylate, hydroxyethane diphosphonate and others may be mentioned from the large number of dispersing agents which may be used.

Compounds of the general formula

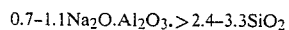
0.7–1.1Na$_2$O.Al$_2$O$_3$.>2.4–3.3SiO$_2$ constitute a special variant, with respect to their crystal structure, of the alkali metal aluminosilicates to be used in accordance with the invention. The possibility of their use as auxiliary soaping agents does not differ from that of the other alkali metal aluminosilicates which have been mentioned.

Compounds of the formula

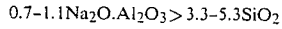
0.7–1.1Na$_2$O.Al$_2$O$_3$>3.3–5.3SiO$_2$ constitute a further variant of the fine-particulate, water-insoluble alkali metal aluminosilicates to be used in accordance with the invention. The production of such products is based on a preparation whose molar composition lies preferably in the range

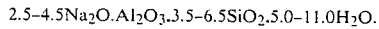
2.5–4.5Na$_2$O.Al$_2$O$_3$.3.5–6.5SiO$_2$.5.0–11.0H$_2$O.

This preparation is crystallized in a conventional manner. Advantageously, this is effected by heating the preparation for at least ½ hour to 100° to 200° C., preferably to 130° to 160° C., under vigorous agitation. The crystalline product is isolated in a simple manner by separation of the liquid phase. If required, it is advisable to wash the products with water, and to dry them at temperatures of from 20° to 200° C., before further processing. The dried products thus obtained still contain bound water. When the products are produced in the manner described, one obtains very fine crystallites which come together to form spherical particles, possibly to form hollow balls having a diameter of approximately 1 to 4μ.

Furthermore, alkali metal aluminosilicates suitable for use in accordance with the invention are those which can be produced from calcinated (destructured) kaolin by hydrothermal treatment with aqueous alkali metal hydroxide. The formula

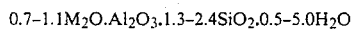

0.7–1.1M$_2$O.Al$_2$O$_3$.1.3–2.4SiO$_2$.0.5–5.0H$_2$O corresponds to the products, M signifying an alkali metal cation, particularly a sodium cation. The production of the alkali metal aluminosilicates from calcinated kaolin leads, without any special technical expense, directly to a very fine-particulate product. The kaolin, previously calcinated at 500° to 800° C., is hydrothermally treated with aqueous alkali metal-hydroxide at 50° to 100° C. The crystallization reaction thereby taking place is generally concluded after 0.5 to 3 hours.

Commercially available, elutriated kaolins predominantly comprise the clay mineral kaolinite of the approximate composition Al$_2$O$_3$.2SiO$_2$.2H$_2$O and which has a layer structure. In order to obtain the alkali metal aluminosilicates, to be used in accordance with the invention, therefrom by hydrothermal treatment with alkali hydroxide, it is first necessary to destructure the kaolin, this being effected to best advantage by heating the kaolin to temperatures of from 500° to 800° C. for two to four hours. The X-ray amorphous anhydrous metakaolin is thereby produced from the kaolin. In addition to destructuring the kaolin by calcination, the kaolin can also be destructured by mechanical treatment (grinding) or by acid treatment.

The kaolins usable as starting materials are light-colored powders of great purity; of course, their iron content of approximately 2000 to 10,000 ppm Fe is substantially higher than the values of from 20 to 100 ppm Fe in the alkali metal aluminosilicates produced by precipitation from alkali metal silicate and alkali metal aluminate solutions. This higher iron content in the alkali metal aluminosilicates produced from kaolin is not disadvantageous, since the iron is firmly bedded in the form of iron oxide in the alkali metal aluminosilicate lattice and is not dissolved out. A sodium aluminosilicate having a cubic, faujasite-like structure is produced during the hydrothermal action of sodium hydroxide on destructured kaolin. Production of such alkali metal aluminosilicates from destructured kaolin with a low iron content are described in U.S. patent application Ser. No. 819,666, filed July 28, 1977, now U.S. Pat. No. 4,089,429.

Alkali metal aluminosilicates, usable in accordance with the invention, may also be produced from calcinated (destructured) kaolin by hydrothermal treatment with aqueous alkali metal hydroxide with the addition of silicon dioxide or a compound producing silicon dioxide. The mixture of alkali metal aluminosilicates of differing crystal structure, generally obtained thereby, comprises very fine-particulate crystal particles having a diameter of less than 20μ, and 100% of which usually comprises particles having a diameter of less than 10μ. In practice, this conversion of the destructured kaolin is effected preferably with aqueous sodium hydroxide and water glass. A sodium aluminosilicate J is thereby produced which is known by several names in the literature, for example, molecular sieve 13×or zeolite NaX (see O. Grubner, P. Jiru and M. Rálek, "Molecular Sieves", Berlin 1968, pages 32, 85–89), when the preparation is preferably not agitated during the hydrothermal treatment, at all events when only low shearing energies are used and the temperature preferably remains at 10° to 20° C. below the boiling temperature (approximately 103° C.). The sodium aluminosilicate J has a cubic crystal structure similar to that of natural faujasite. The conversion reaction may be influenced particularly by agitating the preparation, at elevated temperature (boiling heat at normal pressure or in an autoclave) and greater quantities of silicate, that is, by a molar preparation ratio SiO$_2$:Na$_2$O of at least 1, particularly 0.1 to 1.45, such that sodium aluminosilicate F is produced in addition to, or instead of, sodium aluminosilicate J. Sodium aluminosilicate F is designated "zeolite P" or "type B" in the literature (see D. W. Breck, "Zeolite Molecular Sieves", New York, 1974, page 72). Sodium aluminosilicate F has a structure similar to the natural zeolites gismondine and garronite and is present in the form of crystallites having an externally spherical appearance. In general, the conditions for producing the sodium aluminosilicate F and for producing mixtures of J and F are less critical than those for a pure crystal type A.

The soaping process is performed by using the fine-particulate alkali metal aluminosilicates in the known soaping process following the dyeing process. The alkali metal aluminosilicates are thereby used preferably in combination with surface-active compounds or tensides, particularly anionic and nonionic tensides. Suitable anionic tensides are primarily higher molecular weight sulfates or sulfonates having 8 to 18 carbon atoms, such as primary and secondary alkyl sulfates, alkyl sulfonates or alkylaryl sulfonates, preferably alkylphenyl sulfonates. Suitable nonionic tensides are, for example, the adducts of from 5 to 30 mols of ethylene oxide onto higher fatty alcohols, fatty acids or fatty amines having 8 to 18 carbon atoms, and alkylphenols having 8 to 18 carbon atoms in the alkyl. The anionic and nonionic tensides can be used to advantage in the mixture; however, the soaping process can be conducted in their absence.

Approximately 0.5 to 1 gm/l of tensides are used in the known soaping process in addition to 0.5 to 1.5 gm/l of alkaline salts. On the other hand, in the case of the soaping process in accordance with the invention, only 0.15 to 1.0 gm/l of tensides and 0.3 to 1.5 gm/l of alkali metal aluminosilicates are required. The joint use of alkaline salts is not required. This results in a less expensive soaping process without a decrease in effectiveness.

The use of fine-particulate, water-insoluble alkali metal aluminosilicates has proved to be advantageous for the after-treatment of dyes on different natural and synthetic fibers, and when dyeing or printing with a wide variety of dyes, insofar as an after-soaping process is customarily used. Special advantages have ensued in the treatment of dyes on cellulose fiber material such as cotton, optionally mixed with synthetic fibers, when using naphthol dyes, sulfur dyes and vat dyes, and when dyeing synthetic fiber material, such as polyester fibers, with dispersion dyes. The textile material may be present in the form of yarns, woven fabrics or knitted fabrics and the like. The soaping process is performed intermittently or continuously in a conventional manner on the machines and apparatus used in the textile industry.

The initially described advantages relative to the conventional soaping process are obtained by using, in accordance with the invention, the fine-particulate, water-insoluble alkali metal aluminosilicates as auxiliary soaping agents. In particular, attention may again be drawn to the improvement in the fastness properties, the saving of tensides and salts, and the improvement in the quality of the waste water. The alkali metal aluminosilicates in the form of a dry powder can readily be converted to stable dispersions by stirring them into water or solutions containing dispersing agents, and can be satisfactorily handled in this form. They can be combined with the surfactants used in the soaping process, and, if required, with further conventional additives such as low molecular weight, polyglycol ethers, protein hydrolysates, pine oil or the like, to form stable suspensions which, for use, are to be diluted, without difficulty, with water.

The following preparations and examples are illustrative of the practice of the invention without being limitative in any manner.

PREPARATIONS

I. The Production of Suitable Alkali Metal Aluminosilicates

The silicate solution was added to the aluminate solution under vigorous agitation in a vessel having a capacity of 15 liters. Agitation was effected at 3000 r.p.m. by means of an agitator having a dispersing disc. The two solutions were at room temperature. An X-ray amorphous sodium aluminosilicate was formed as a primary product of precipitation with an exothermic reaction. After agitating for 10 minutes, the suspension of the precipitation product was transferred to a crystallizer and, for the purpose of crystallization, remained in the crystallizer for 6 hours at 90° C. under agitation (250 r.p.m.). The mother liquor was drawn off from the crystal sludge and the filtration residue was washed with deionized water until the washing water flowing off had a pH value of approximately 10. Therefore the washed filtration residue was dried as specified. Instead of the dried sodium aluminosilicate, the suspension of the crystallization product or the crystal sludge was also used to produce the auxiliary soaping agents. The water contents were determined by heating the predried products to 800° C. for 1 hour. The sodium aluminosilicates, washed or neutralized to the pH value of approximately 10, and then dried, were subsequently ground in a ball mill. The grain size distribution was determined by means of a sedimentation balance.

The calcium binding power of the aluminosilicates was determined in the following manner:

1 gm of aluminosilicate (based on the anhydrous active substance) was added to 1 l of an aqueous solution containing 0.594 gm of $CaCl_2$ (=300 mg CaO/l=30° dH) and adjusted to a pH value of 10 with diluted NaOH. The suspension was then vigorously agitated for 15 minutes at a temperature of 22° C. (−2° C.). The residual hardness x of the filtrate was determined after filtering off the aluminosilicate. The calcium binding capacity was calculted therefrom in mg CaO/gm AS in accordance with the formula: $(30-x) \cdot 10$. For short hand purposes the above procedure is hereinafter referred to by the Calcium Binding Power Test Method.

When the calcium binding capacity is determined at higher temperatures, for example, at 60° C., far better values are found than when it is determined at 22° C.

| Conditions for producing sodium aluminosilcate A: | |
| --- | --- |
| Precipitation: | 2.935 kg of aluminate solution of the composition: 17.7% $Na_2O$, 15.8% $Al_2O_3$, 66.6% $H_2O$ 0.15 kg of caustic soda 9.420 kg of water 2.445 kg of a 28.5% sodium silicate solution of the composition 1 $Na_2O \cdot 6.0$ $SiO_2$, freshly prepared from commercially available water glass and slightly alkali-soluble silicic acid |
| Crystallization: | 6 hours at 90° C. |
| Drying: | 24 hours at 100° C. |
| Composition: | 0.9 $Na_2O \cdot 1$ $Al_2O_3 \cdot 2.04$ $SiO_2$. 4.3 $H_2O$ (= 21.6% $H_2O$) |
| Degree of crystallization: | Fully crystalline. |
| Calcium binding power: | 170 mg CaO/gm active substance. |

The particle size distribution, determined by sedimentation analysis, resulted in a mixture range of the particle size distribution curve at 3 to 6μ.

The sodium aluminosilicate A exhibits the following interference lines in the X-ray diffraction graph:

| d values, photographed with $Cu-K_\alpha$ radiation in Å |
| --- |
| I |
| — |
| 12.4 |
| — |
| 8.6 |
| 7.0 |
| — |
| 4.1 (+) |
| — |
| 3.68 (+) |
| 3.38 (+) |
| 3.26 (+) |
| 2.96 (+) |
| — |
| — |
| 2.73 (+) |
| — |
| 2.60 (+) |

It is quite possible that all these interference lines will not appear in the X-ray diffraction graph particularly when the aluminosilicates are not fully crystallized. Thus, the most important d values for characterizing these types have been characterized by a "(+)".

| Conditions for producing sodium aluminosilicate B: | |
| --- | --- |
| Precipitation: | 7.63 kg of an aluminate solution of of the composition 13.2% $Na_2O$; 8.0% $Al_2O_3$; 78.8% $H_2O$; 2.37 kg of a sodiuum silicate solution of the composition 8.0% $Na_2O$; 26.9% $SiO_2$; 65.1% $H_2O$; |
| Preparation ratio in mol: | 3.24 $Na_2O$; 1.0 $Al_2O_3$; 1.78 $SiO_2$; 70.3 $H_2O$; |
| Crystallization: | 6 hours at 90° C.; |
| Drying: | 24 hours at 100° C.; |
| Composition of the dried product | 0.99 $Na_2O \cdot 1.00$ $Al_2O_3 \cdot 1.83$ $SiO_2$. 4.0 $H_2O$; (= 20.9% $H_2O$) |
| Crystalline form: | Cubic with greatly rounded corners and edges; |

| | |
|---|---|
| Average particle diameter: | 5.4μ |
| Calcium binding powder: | 172 mg CaO/gm active substance. |

| Conditions for producing sodium aluminosilicate C: | |
|---|---|
| Precipitation: | 12.15 kg of an aluminate solution of the composition 14.5% $Na_2O$; 5.4% $Al_2O_3$; 80.1% $H_2O$; 2.87 kg of a sodium silicate solution of the composition 8.0% $Na_2O$; 26.9% $SiO_3$; 65.1% $H_2O$; |
| Preparation ratio in mol: | 5.0 $Na_2O$; 1.0 $Al_2O_3$; 2.0 $SiO_2$; 100 $H_2O$; |
| Crystallization: | 1 hour at 90° C.; |
| Drying: | Hot atomization of a suspension of the washed product (pH 10) at 295° C.; Content of solid substance in the suspension 46%; |
| Composition of the dried product: | 0.96 $Na_2O.1$ $Al_2O_3.1.96$ $SiO_2$. 4 $H_2O$; |
| Crystalline form: | Cubic with greatly rounded corners and edges; Water content 20.5%; |
| Average particle diameter: | 5.4μ |
| Calcium binding power: | 172 mg CaO/gm active substance. |

Conditions for producing potassium aluminosilicate D:

The sodium aluminosilicate C was produced in the first instance. After the mother liquor had been drawn off, and the crystalline mass had been washed to the pH value 10 with demineralized water, the filtration residue was suspended in 6.1 l of a 25% KCl solution. The suspension was heated for a short time to 80° to 90° C., and was then cooled, filtered off again and washed.

| | |
|---|---|
| Drying: | 24 hours at 100° C.; |
| Composition of the dried product: | 0.35 $Na_2O.0.66$ $K_2O.1.0$ $Al_2O_3$ 1.96 $SiO_2.4.3$ $H_2O$; (water content 20.3%) |

| Conditions for producing sodium aluminosilicate E: | |
|---|---|
| Precipitation: | 0.76 kg of aluminate solution of the composition: 36.0% $Na_2O$, 59.0% $Al_2O_3$, 5.0% water 0.94 kg of caustic soda; 9.94 kg of water; 3.94 kg of a commercially available sodium silicate solution of the composition: 8.0% $Na_2O$, 26.9% $SiO_2$, 65.1% $H_2O$; |
| Crystallization: | 12 hours at 90° C.; |
| Drying: | 12 hours at 100° C.; |
| Composition: | 0.9 $Na_2O.1$ $Al_2O_3.3.1$ $SiO_2$. 5 $H_2O$; |
| Degree of crystallization: | Fully crystalline. |

The maximum range of the particle size distribution curve at 3 to 6μ.
Calcium binding power: 110 mg CaO/gm active substance.

The aluminosilicate E exhibited the following interference lines in the X-ray diffraction graph:

| d-values, photographed with Cu—$K_\alpha$ radiation in Å |
|---|
| 14.4 |
| — |
| 8.8 |
| — |
| — |
| 4.4 |
| — |
| 3.8 |
| — |
| — |
| — |
| 2.88 |
| 2.79 |
| — |
| 2.66 |
| — |

| Conditions for producing sodium aluminosilicate F: | |
|---|---|
| Precipitation: | 10.0 kg of an aluminate solution of the composition: 0.84 kg $NaAlO_2$ + 0.17 kg NaOH + 1.83 kg $H_2O$; 7.16 kg of a sodium silicate solution of the composition 8.0% $Na_2O$, 26.9% $SiO_2$, 65.1% $H_2O$; |
| Crystallization: | 4 hours at 150° C.; |
| Drying: | Hot atomization of a 30% suspension of the washed product (pH 10); |
| Composition of the dried product: | 0.98 $Na_2O.1$ $Al_2O_3.4.12$ $SiO_2$. 4.9 $H_2O$; |

The particles were of spherical shape; the average diameter of the balls was approximately 3 to 6μ.
Calcium binding power: 132 mg CaO/gm active substance at 50° C.

| Conditions for producing sodium aluminosilicate G: | |
|---|---|
| Precipitation: | 7.31 kg aluminate (14.8% Na O, 9.2% $Al_2O_3$, 76.0% $H_2O$) 2.69 kg silicate (8.0% $Na_2O$, 26.9% $SiO_2$, 65.1% $H_2O$); |
| Preparation ratio in mol: | 3.17 $Na_2O$, 1.0 $Al_2O_3$, 1.82 $SiO_2$, 62.5 $H_2O$; |
| Crystallization: | 6 hours at 90° C.; |
| Composition of the dried product: | 1.11 $Na_2O.1$ $Al_2O_3.1.89$ $SiO_2$, 3.1 $H_2O$ (= 16.4% $H_2O$); |
| Crystalline structure: | Mixed structural type in the ratio 1:1; |
| Crystalline form: | Rounded crystallites; |
| Average particle diameter: | 5.6μ. |
| Calcium binding power: | 105 mg CaO/gm active substance at 50° C. |

Conditions for producing sodium aluminosilicate H produced from kaolin:

1. Destructuring Kaolin

In order to activate the natural kaolin, samples of 1 kg were heated to 700° C. in a Schammote crucible for 3 hours. The crystalline kaolin $Al_2O_3.2SiO_2.2H_2O$ was thereby converted to the amorphous metakaolin $Al_2O_3.2SiO_2$.

2. Hydrothermal treatment of metakaolin

The alkali solution was placed in an agitating vessel and the calcined kaolin was added under agitation at temperatures between 20° and 100° C. The suspension was brought to the crystallization temperature of 70° to 100° C. under agitation, and was maintained at this temperature until the crystallization operation had terminated. The mother liquor was subsequently drawn off and the residue was washed with water until the washing water draining off had a pH value of from 9 to 11. The filter cake was dried and was subsequently crushed to a fine powder or was ground to remove the agglomerates produced during drying. This grinding process was omitted when the filtration residue was further processed in a wet state or when the drying operation was performed by means of a spray dryer or a flow dryer. Alternatively, the hydrothermal treatment of the calcined kaolin can be performed in a continuous operation.

| Preparation: | 1.65 kg of calcined kaolin 13.35 kg of 10% NaOH, mixed at room temperature; |
|---|---|
| Crystallization: | 2 hours at 100° C.; |
| Drying: | 2 hours at 160° C. in a vacuum drying cabinet; |
| Composition: | 0.88 Na$_2$O.1 Al$_2$O$_3$.2.14 SiO$_2$. 3.5 H$_2$O (= 18.1% H$_2$O); |
| Crystalline structure: | Mixed structural type like Na aluminosilicate G, although in the ratio 8:2. |
| Average particle diameter: | 7.0μ |
| Calcium binding power: | 126 mg CaO/gm active substance. |

Conditions for producing sodium aluminosilicate J produced from kaolin:

The destructuring of the kaolin and the hydrothermal treatment were effected in the same manner as in the case of H.

| Preparation: | 2.6 kg of calcined kaolin, 7.5 kg of 50% NaOH, 7.5 kg of water glass, 51.5 kg of deionized water, mixed at room temperature; |
|---|---|
| Crystallization: | 24 hours at 100° C., without agitation; |
| Drying: | 2 hours at 160° C. in a vacuum drying cabinet; |
| Composition: | 0.93 Na$_2$O.1 Al$_2$O$_3$.3.60 SiO$_2$. 6.8 H$_2$O (= 24.6% H$_2$O); |
| Crystalline structure: | Sodium aluminosilicate J in accordance with above definition, cubic crystallites; |
| Average particle diameter | 8.0μ |
| Calcium binding power: | 105 mg CaO/gm active substance. |

II. Tensides or Tenside Mixtures for the Soaping Process (A) Mixtures of equal parts of the adduct of fatty alcohol C$_{10-16}$+9.5 mols of ethylene oxide and the linear alkylsulfate C$_{12-18}$, Na or NH$_4$ salt (B) Mixtures of equal parts of the adduct of fatty alcohol C$_{10-16}$+11 mols of ethylene oxide and C$_{12}$ alkylbenzene sulfonate, Na salt.

EXAMPLE 1

(Reactive dyeing)

A dyeing with 2.6% of C.I. Reactive Orange 20 on precleaned cotton tricot was soaped in a launderometer both in accordance with the standard method and, in accordance with the method of the present invention, with the joint use of alkali metal aluminosilicate (Al-silicate).

Conditions: soft water 0°-0.5° dH, 10 balls, 15 minutes at 90° C., rinsed 3×60 seconds, liquor ratio 1:30.

The washing fastness was determined in accordance with DIN 54 010/54 011, and the rubbing fastness was determined in a dry state in accordance with DIN 54 021. The results are reported in Table I.

TABLE I

| | pH of the liquor | Washing fastness DIN 54010 | Rubbing Fastness din 54021 dry |
|---|---|---|---|
| 1.5 gm/l Tenside II A 1.0 gm/l sodium carbonate | 10.5 | 3 | 3–4 |
| 1.5 gm/l Tenside II A 1.0 gm/l sodium tripolyphosphate | — | 3 | 3–4 |
| 0.5 gm/l Tenside II A 0.5 gm/l Al-silicate I A | 8.5 | 5 | 4–5 |
| 0.5 gm/l Al-silicate I A | 8.6 | 4 | 4 |

Fastness:
1 = slight
5 = very good

Corresponding results were also obtained with the sodium aluminosilicate I B.

EXAMPLE 2

(Reactive dyeing)

In a works test, (a) pre-cleaned cotton tricot/stretch polyamide, dyed with 3.5% C.I. Reactive red 147, (b) cotton tricot, roughened (pre-cleaned), dyed with 2.20% C.I. Reactive Orange 20 and 0.05% C.I. Reactive Red 42, (c) cotton tricot (pre-cleaned), dyed in the same manner as (b) were soaped in a reel machine both in accordance with the standard method and in accordance with the method of the present invention.

Conditions: soft water 0°-0.5° dH, 20 minutes at 95° C., liquor ratio 1:20. After soaping, the material was hot-rinsed once (90° C., 5 minutes) and cold-rinsed once. the fastness was determined in the same manner as in Example 1 and reported in Table II.

TABLE II

| | Washing fastness DIN 54010/54011 | fastness DIN 54021 dry |
|---|---|---|
| Dyeing (a) | | |
| 1 gm/l Tenside IIA | 60° C.; 3–4 95° C.; 3 | 3–4 |
| 0.75 gm/l Tenside II A 0.75 gm/l Al-silicate I C | 60° C.; 5 95° C., 4–5 | 4–5 |
| Dyeing (b) | | |
| 1 gm/l Tenside II B | 60° C.; 3–4 95° C.; 3 | 2–3 |
| 0.5 gm/l Tenside II B 0.5 gm/l Al-silicate I D | 60° C.; 4–5 95° C. 4–5 | 5 |
| Dyeing (c) | | |
| 1 gm/l Tenside II A | 60° C.; 3–4 95° C.; 3 | 3 |
| 0.5 gm/l Tenside II A 0.5 gm/l Al-silicate I A | 60° C.; 5 95° C.; 4–5 | 4–5 |

Fastness:
1 = slight
5 = very good

EXAMPLE 3

(Indanthrene dyeing)

In contrast to the reactive dyes dealt with in Example 2, Indanthrene ® dyes have very good fastness which lies between 4–5 and 5. Thus, there is no further increase by adding aluminosilicates when soaping.

However, the soaping process can be shortened by the use of the aluminosilicates, and at the same time it is possible to save water.

A cotton tricot (pre-cleaned) was dyed with
(a) 3% C.I. Vat Blue 20

(b) 2.8% C.J. Vat Green 2 in a works test and was soaped in a reel machine both in accordance with the standard method and in accordance with the method of the present invention with the joint use of Na Al-silicate. In the latter case, it was possible to achieve a considerable saving of time and water.

Soaping in accordance with the standard method:
 2 gm/l Tenside II A,
 30 minutes at 90°–95° C., subsequently rinsed twice.

Soaping in accordance with the method of the present invention:
 1 gm/l Tenside II A
 1 gm/l Na Al-silicate I B
 15 minutes at 90°–95° C., subsequently cold-rinsed once.

The fastness obtained by the method in accordance with the invention corresponded at least to that of the standard method.

EXAMPLE 4

(Naphthol dyeing)

In a laboratory test, cotton fabric (pre-cleaned) was dyed by the foulard method with
(a) Priming: 14.0 gm/kg of fabric of C.I. Acoic Coupling Component 2. Development: 48.5 gm/kg of fabric of C.I. Acoic Coupling Component 35.
(b) Priming: 14.0 gm/kg of fabric of C.I. Acoic Coupling Component 20. Development: 43.5 gm/kg of fabric of C.I. Acoic Coupling Component 35 and was subsequently soaped as set forth in Table III.

TABLE III

|  | pH of the liquor | Washing fastness DIN 54010 | Rubbing fastness DIN 54021 dry |
| --- | --- | --- | --- |
| Dye (a) |  |  |  |
| 2 gm/l Tenside II B | 10.3 | 3–4 | 4 |
| 1 gm/l Sodium Carbonate |  |  |  |
| 2 gm/l Tenside II B | 10.0 | 3 | 4 |
| 1 gm/l Sodium Tripolyphosphate |  |  |  |
| 0.5 gm/l Tenside II B | 8.3 | 4–5 | 4–5 |
| 0.5 gm/l Al-silicate I A |  |  |  |
| 0.5 gm/l A-silicate I A | — | 4 | 4 |
| Dye (b) |  |  |  |
| 1.5 gm/l Tenside II A | 10.1 | 3 | 4 |
| 1 gm/l Sodium Carbonate |  |  |  |
| 0.5 gm/l Tenside II A | 8.3 | 4–5 | 4–5 |
| 0.5 gm/l Al-silicate I B |  |  |  |

Fastness:
1 = slight
5 = very good

Corresponding results were obtained when the tests were repeated with the Al-silicates I G and I H.

EXAMPLE 5

(Reactive Dyeing)

In a works test, 200 kg of cotton tricot 1/1 (pre-cleaned) were dyed in a reel machine with a liquor ratio 1:20 with
 1.44% C.I. Reactive Green 12
 1.80% C.I. Reactive Yellow 64
and were subsequently rinsed and soaped.
(a) conventional soaping method
 After dyeing, the material was cold-rinsed for 10 minutes, hot-rinsed for 15 minutes, soaped with 2 gm/l of washing agent for 30 minutes (95° C.), rinsed with overflow for 20 minutes, and then hot- and cold-rinsed again for 10 minutes.
(b) After-soaped in accordance with the method of the present invention
 Cold-rinsed with overflow for 10 minutes, hot-rinsed for 15 minutes, soaped at 90° C. for 30 minutes with
 1 gm/l Tenside II B
 1 gm/l Al-silicate I D
and subsequently cold-rinsed for 10 minutes.

It was possible to reduce the period of treatment, and also to reduce the consumption of water and energy by approximately 30% when performing the rinsing and soaping processes by the method in accordance with the invention. The fastnesses as reported in Table IV were obtained:

TABLE IV

|  | Washing fastness DIN 54010/54011 | Rubbing fastness DIN 54021 | |
| --- | --- | --- | --- |
|  |  | Dry | Wet |
| (a) Conventional soaping method |  | 5 | 4 |
| 60° C. | 4 |  |  |
| 95° C. | 3–4 |  |  |
| (b) Method in accordance with the invention |  | 5 | 4 |
| 60° C. | 4–5 |  |  |
| 95° C. | 4 |  |  |

EXAMPLE 6

(Continuous washing test—polyester printed material)

Material: 4000 m polyester woven material (print: black with white background).

Printing color: 150 gm of palanil black GEL ®/kg printing paste (palanil black GEL ® is not included in the Color Index).

Thickening: Thickening agent combination (such as Diaprint ® types).

After-soaping process in a continuous washing machine in a vat with 6 compartments with reels and a preceding roller.

(a) Work is carried out in the following manner by the known soaping process:

| Roller vat: | Cold with overflow |
| --- | --- |
| 1st washing compartment: | 1 gm/l washing agent, cold |
| 2nd and 3rd washing compartments: | 1 gm/l washing agent |
|  | 1 gm/l sodium hyposulfite |
|  | 2 ml/l caustic soda 38° Be |
|  | Temperature 80° C. |
| 4th washing compartment: | 1 gm/l sodium hyposulfite |
|  | 2 ml/l caustic soda 38° Be |
|  | Temperature 80° C. |
| 5th washing compartment: | Rinsing bath 25° C. |
| 6th washing compartment: | Rinsing bath with overflow 25° C. |
| Total washing and rinsing time = 15 minutes | |

(b) Continuous after-soaping process in accordance with the method of the present invention, the washing agent used hitherto being replaced by
 0.25 gm/l Tenside II A
 0.25 gm/l Al-silicate I A
in the 2nd and 3rd washing compartments.

Compared with the method known hitherto, a substantially brighter white background was obtained by the method in accordance with the invention, with at least equal fastnesses and a reduced concentration of washing agent.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process of dyeing or printing textile materials comprising subjecting textile material to the action of aqueous dye solutions or suspensions at elevated temperatures, followed by soaping with soaping agents and recovery of the dyed or printed textile materials, the improvement consisting essentially of employing a fine-particulate, water-insoluble alkali metal aluminosilicate, containing bound water, of the formula $$(M_2O)_x \cdot Al_2O_3 \cdot (SiO_2)_y$$

wherein M represents an alkali metal, x is a number from 0.7 to 1.5 and y is a number from 0.8 to 6, said aluminosilicate having an average particle size in the range of from 0.1 to 25μ and a calcium binding power of from 20 to 200 mg CaO/gm of anhydrous active substance measured at 22° C. according to the Calcium Binding Power Test Method, as the sole soaping agent in the absence of polyphosponates and surfactants.

2. The process of claim 1 wherein said alkali metal aluminosilicate has the formula $$0.7-1.1 M_2O \cdot Al_2O_3 \cdot 1.3-3.3 SiO_2.$$

3. The process of claim 1 wherein said alkali metal aluminosilicate has the formula $$0.7-1.1 Na_2O \cdot Al_2O_3 \cdot >2.4-3.3 SiO_2.$$

4. The process of claim 1 wherein said alkali metal aluminosilicate has the formula $$0.7-1.1 Na_2O \cdot Al_2O_3 \cdot >3.3-5.3 SiO_2.$$

5. The process of claim 1 wherein said alkali metal aluminosilicate has the formula $$0.7-1.1 M_2O \cdot Al_2O_3 \cdot 1.3-2.4 SiO_2 \cdot 0.5-5.0 H_2O$$

as produced from calcined kaolin.

6. The process of claim 1 wherein said aqueous dye solutions contain dyes for dyeing or printing textiles selected from the group consisting of naphthol dyes, reactive dyes, sulfur dyes, vat dyes and dispersion dyes.

7. The process of claim 1 wherein said textile materials are selected from the group consisting of cellulose fiber material, synthetic fiber material and mixtures thereof.

8. In the process of dyeing or printing textile materials comprising subjecting textile material to the action of aqueous dye solutions or suspensions at elevated temperatures, followed by soaping with soaping agents and recovery of the dyed or printed textile materials, the improvement consisting essentially of employing as sole soaping agent, in the absence of polyphosphonates and surfactants a soaping agent comprising from about 0.3 to 1.5 gm/l of a fine-particulate, water-insoluble alkali metal aluminosilicate, containing bound water, of the formula $$(M_2O)_x \cdot Al_2O_3 \cdot (SiO_2)_y$$

wherein M represents an alkali metal, x is a number from 0.7 to 1.5 and y is a number from 0.8 to 6, said aluminosilicate having an average particle size in the range of from 0.1 to 25μ and a calcium binding power of from 20 to 200 mg CaO/gm of anhydrous active substance measured at 22° C. according to the Calcium Binding Power Method, based upon the volume of the soaping solution.

9. The process of claim 8 wherein said alkali metal aluminosilicate has the formula $$0.7-1.1 M_2O \cdot Al_2O_3 \cdot 1.3-3.3 SiO_2.$$

10. The process of claim 8 wherein said alkali metal aluminosilicate has the formula $$0.7-1.1 Na_2O \cdot Al_2O_3 \cdot >2.4-3.3 SiO_2.$$

11. The process of claim 8 wherein said alkali metal aluminosilicate has the formula $$0.7-1.1 Na_2O \cdot Al_2O_3 \cdot >3.3-5.3 SiO_2.$$

12. The process of claim 8 wherein said alkali metal aluminosilicate has the formula $$0.7-1.1 M_2O \cdot Al_2O_3 \cdot 1.3-2.4 SiO_2 \cdot 0.5-5.0 H_2O$$

as produced from calcined kaolin.

13. The process of claim 8 wherein said aqueous dye solutions contain dyes for dyeing or printing textiles selected from the group consisting of naphthol dyes, reactive dyes, sulfur dyes, vat dyes and dispersion dyes.

14. The process of claim 8 wherein said textile materials are selected from the group consisting of cellulose fiber material, synthetic fiber material and mixtures thereof.

* * * * *